March 27, 1934.  F. C. MOCK  1,952,816

FUEL INJECTOR

Filed April 4, 1931

Inventor
Frank C. Mock.
F. B. Smith.
Attorney

Patented Mar. 27, 1934

1,952,816

UNITED STATES PATENT OFFICE 1,952,816

FUEL INJECTOR

Frank C. Mock, Montclair, N. J., assignor to Bendix Research Corporation, East Orange, N. J., a corporation of Indiana Application April 4, 1931, Serial No. 527,791

18 Claims. (Cl. 299—107.6)

This invention relates to internal combustion engines and more particularly to the injection of liquid fuel into the cylinders of such engines.

One of the objects of the present invention is to provide a novel fuel injector for internal combustion engines.

Another object of the present invention is to provide a novel fuel injector which is adapted to be automatically operated by the pressure of the liquid fuel for injecting a charge of the fuel into the cylinder in a more highly atomized condition than has heretofore been possible under the same conditions.

Another object of the present invention is to provide a fuel injector having a novel valve head construction for controlling the injection of a fuel charge, and producing a turbulent and visibly opaque stream of fuel as it leaves the nozzle orifice which immediately breaks up into fine particles as the stream expands in the cylinder.

Another object of the present invention is to provide a fuel injector having a novel head construction forming a seat adjacent the discharge orifice, insuring positive actuation of the valve by the pressure of the liquid fuel.

Another object of the present invention is to provide a novel fuel injector which is simple and compact, positive in its operation and efficient for the purpose intended.

These and other objects will be more apparent from the following description and drawing in which like reference characters denote like parts throughout the several views. It is to be expressly understood, however, that the drawing is for the purpose of illustration only and does not define the limits of the invention; reference being had for this purpose to the appended claims.

Fuel injector valve constructions have heretofore been provided with a needle valve head of conical shape. However, with such valves the flow of liquid fuel through the nozzle orifice has been of a stream like nature with the result that under pressures of fifty to two hundred pounds per square inch the discharge is non-turbulent and glassy in appearance and drawn together by surface tension so that when the stream later divides the drops are relatively large. The present invention obviates these difficulties to a considerable degree and the stream of liquid fuel leaving the nozzle orifice in the range of pressures above mentioned is turbulent and visibly opaque and breaks up into fine particles immediately as the stream expands beyond the nozzle orifice. Also at high pressures the present invention produces a discharge that is more finely divided than the discharge from those fuel injectors heretofore used.

Figure 1:
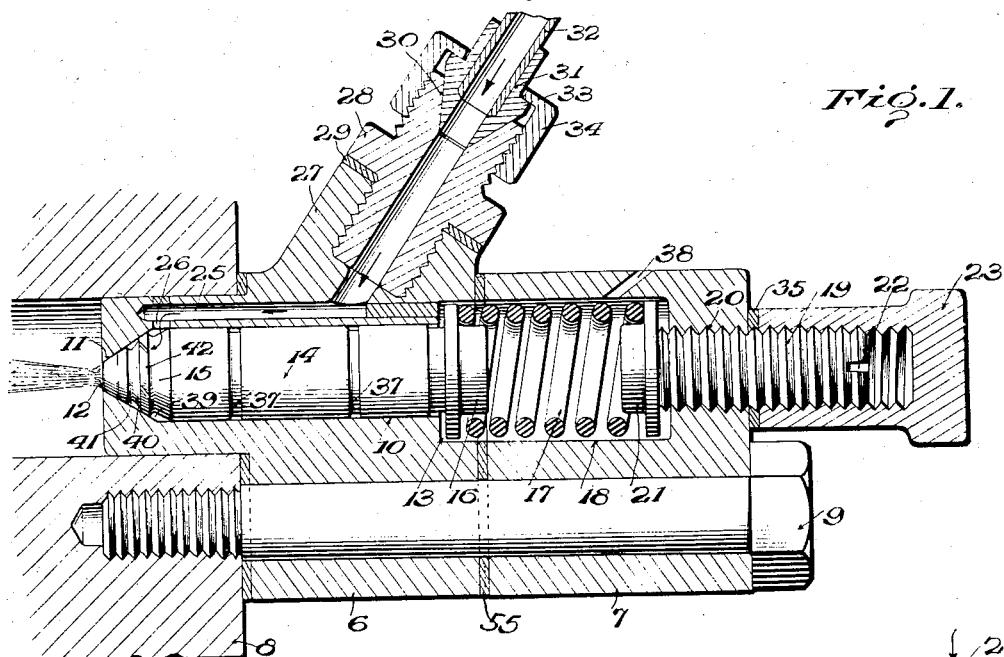
Fig. 1 is a longitudinal sectional view of a fuel injector mounted on a cylinder head and incorporating the novel features of the present invention.

The fuel injector illustrated in Fig. 1 and incorporating the novel features of the present invention includes a casing having an inner part 6 and an outer part 7 for carrying the valve mechanism, and which is held in place on a cylinder head 8 by means of bolts 9. Within the inner casing part 6 a bore 10 is provided that terminates in a conical valve seat 11 at one end, forming a nozzle orifice 12 at its apex. At the other end the bore terminates in an annular shoulder 13 adjacent the outer surface of the inner casing member 6.

Within the bore 10 is positioned a valve 14 having a cylindrical body portion closely fitting the wall of the bore 10. At the lefthand end of this valve, as viewed in the drawing, a head 15 is provided of generally conical shape tapering from the diameter of the valve body to the diameter of the nozzle orifice. This conical head 15 is adapted to cooperate with the conical valve seat 11 and form a tight joint therewith, preventing any leakage of the fuel into the combustion chamber except at the proper time for fuel injection. At the rear of the body portion of the valve an annular shoulder 16 is provided which is engaged by a spring 17 for yieldingly holding the valve head 15 against the seat 11 with a predetermined pressure.

Preferably the outer casing member 7 has a bore 18 in axial alinement with the bore 10 in the inner casing member 6 but of greater diameter and in which the spring 17 may be located. An adjusting screw 19 extending through an aperture 20 in the end of the outer casing member 7, has a threaded engagement therewith. This threaded adjusting member 19 is adapted to engage a collar 21 in the bore 18 at one end, and is provided at its other end with a slot 22 for receiving an actuating tool. With this construction the tension of the spring and pressure exerted upon the valve 14 can be varied by adjusting the position of the member 19, which compresses the spring between the collar 21 and the annular shoulder 13. A cap 23 having a gasket 35 is provided for protecting the threads on the member 19, and which also acts as a lock nut for preventing any movement of the member 19 after it has once been set. A metal gasket 55 is provided between the inner and outer casing members 6 and 7 to insure a tight joint.

In the form shown fuel may be supplied to the head 15 of the valve 14 through a supply conduit 25 and connecting passages 26 communicating with the interior of the bore 10. The conduit 25 extends back from the head end of the valve 14 parallel with the body of the valve for a short distance and then outwardly from the axis of the valve at an angle, to facilitate connection to a pump supply connection; the inner casing 6 having a boss 27 for this purpose.

The boss 27 is provided with a bore of greater diameter than the conduit at its outer end and is tapped to receive a nipple 28 which makes a tight connection with the shoulder of the boss by means of a packing 29. The outer end of the nipple 28 has an interiorly tapered seat 30 for receiving the conical head 31 of a tubular connection 32 leading from a fuel pump (not shown). The head member 31 is provided with a shoulder 33 adapted to be engaged by the nut 34 having a threaded connection with the outer end of the nipple 28. With this construction the nut 34 may be tightly screwed upon the nipple 28 to force the head 33 of the fuel pump connection into a tight compression joint with the nipple.

The body portion of the valve 14 intermediate its ends is provided with annular grooves 37 adapted to receive any oil leaking back from the head of the valve, which will act as a lubricant to reduce friction and wear. A vent 38 in the outer casing part 7 connects the bore 18 with the atmosphere preventing an excess of oil leaking into the bore, from interfering with the proper movement of the valve.

Figure 2:
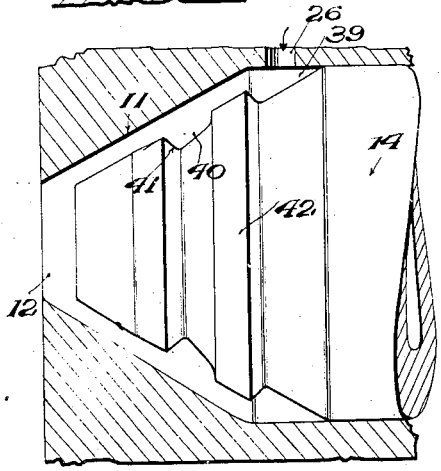
Fig. 2 is an enlarged sectional view of one form of injector valve head incorporating the novel features of the present invention.

As more clearly shown in Fig. 2 the valve head for controlling the flow of liquid fuel through the nozzle orifice 12, is provided with an annular recess 39 at its rear portion starting at a point slightly forward of the end of the taper with a shoulder substantially normal to the surface of the conical valve seat, and then extending back gradually beyond the inlet orifice 26 in the valve casing, and constituting a chamber for receiving the liquid fuel under pressure. The head 15 is also provided with a second annular recess 40 intermediate the ends of the head which extends from its rear with increasing depth to a terminating shoulder 41 that is substantially normal to the surface of the conical seat. Between the rear edge of the intermediate recess and the forward edge of the rear recess a frusto-conical shoulder 42 is formed which cooperates with the valve seat 11 in a closed position of the valve.

The operation of the device is as follows: At the proper time in the engine cycle liquid fuel under pressure enters the casing through the connection 32 and nipple 28 and is directed by the conduit 25 to the apertures 26, where it enters the annular recess 39 at the rear of the head. The pressure of the fuel acts on the area of the valve head between the outside diameter of the shoulder 42 and the diameter of the body portion 14 of the valve, for moving the valve to the right as shown in Fig. 1, against the action of the spring 17. With this movement of the valve to the right a path is provided for the flow of fuel between the valve head 15 and seat 11. This path is first constricted by the frusto-conical shoulder 42 and valve seat 11 beyond which the path gradually increases its area due to the increasing depth of the intermediate recess 40. This expanding passage terminates abruptly in a sharp edge formed by the shoulder 41 normal to the surface of the valve seat. After the sharp edge the path becomes again further constricted terminating in the discharge orifice 12. The liquid fuel under pressure following this path will first increase its velocity due to the restriction and then pass into the area of expansion. The tendency of the fuel to follow the contour of the wall will cause the greater part of the stream to strike against the annular shoulder forming the sharp edge 41 at the end of the intermediate recess; the resulting shock creating turbulent and pressure waves in the stream, which after passing through the area of greater restriction discharges from the nozzle orifice 12 in the form of a spray finely subdivided, opaque in appearance, and unstable in condition causing the stream to quickly break up into fine drops.

In high compression engines where the combustion chamber is relatively small, such fuel injection is particularly advantageous as less of the injection energy is put into discharge velocity and more put into internal turbulence of the fuel so that both finer atomization and lower penetration result.

Figure 3:
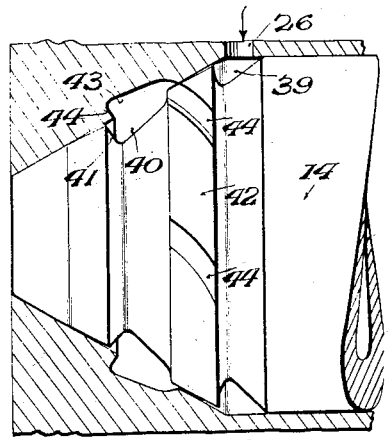
Fig. 3 is an enlarged sectional view of a fuel injector valve head having modified structural features from the fuel injector shown in Fig. 2.

In the modification of valve head structure shown in Fig. 3 an annular recess 43 is formed in the valve seat intermediate its ends and similar to the intermediate annular recess 40 formed in the valve head. This recess 43 in the valve seat increases in depth from its rear or right-hand portion and terminates in an annular shoulder 44 substantially normal to the conical surface of the valve seat. With this construction the effect of an expanding area terminating in a sharp edge in the path of flow is increased, and the discharge decreased, which allows a larger valve to be used advantageously in small engines to produce the desired results. Also in this modification the frusto-conical shoulder 42 is preferably provided with spiral slots or grooves 44 on its periphery for increasing the area on which pressure may act to move the valve 14 and for causing the liquid fuel to discharge in a centrifugal spray which will increase the turbulence of the stream. The increased area on which the liquid fuel pressure may act, is advantageous with high compression engines in which the fuel is injected during combustion, as the actuation is more positive, insuring prompt opening and closing of the valve, and particularly in preventing any dribble of fuel due to lag in the valve closing. Further with this construction the stream of liquid fuel after passing through the grooves 44, engages the sharp edge and further restricted area which tends to dampen the effect of individual streams formed by the grooves so that the discharge is in the form of a rotating cone which will immediately break into fine drops.

Figure 4:
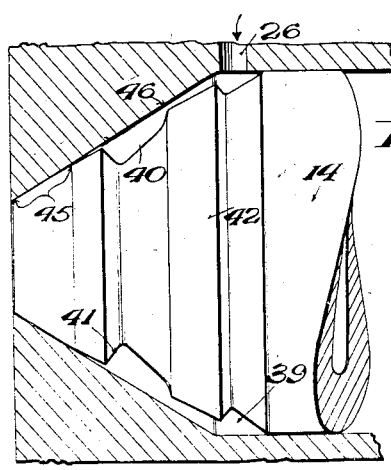
Fig. 4 is an enlarged sectional view of a modified fuel injector head similar to Fig. 2 but including structural features not shown in either Figs. 2 or 3.
Figure 5:
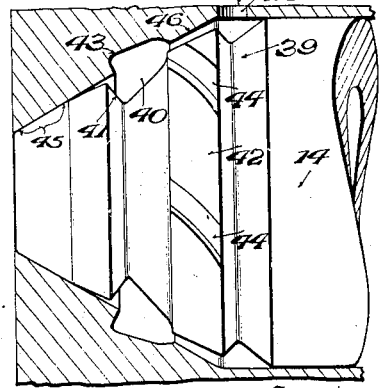
Fig. 5 is an enlarged sectional view of a fuel injector valve head similar to the modification shown in Fig. 3 but including the modified structure of Fig. 4.

In the preferred form as shown in Figs. 4 and 5 a construction is provided insuring a tight seat adjacent the nozzle orifice, but having a slight clearance between the head and seat for the remaining area, so that the pressure of the liquid fuel acts on a larger part of the conical head. In Fig. 4 the construction is very similar to the modification shown in Fig. 2, with the valve head 15 being of generally conical shape and having rear and intermediate annular recesses 39 and 40 respectively, forming a frusto-conical shoulder 42 with a plain peripheral surface. In this modification, however, the surface of the internal valve seat 11 is reamed, hardened, and lapped so that the surface forms a specified angle with the axis of the valve and seat. The conical head 15 of the valve 14 after hardening, is ground concentric with the axis of the valve to form a cone having a surface of slightly less angle with respect to the axis from the valve seat. This angular difference should be very slight, about one-half of one degree, and certainly less than one degree. The conical valve head 15 is then lapped in place in the valve seat 11 using some fine abrasive compound so as to obtain an absolutely tight seat for a small area 45 adjacent the orifice and providing a clearance 46 of one to two thousandths of an inch on the larger diameter of the cone. This construction determines the tightness and area of the valve seat at the smallest diameter of the cone, preventing any variation in the force acting on the valve from the gases in the combustion chamber leaking between the valve and seat at the nozzle 12, and preventing any dribble of fuel after the valve closes. This construction of valve head and seat also insures the pressure of the liquid fuel acting on a large area of the head 15 and the proper operation of the valve.

The modification shown in Fig. 5 incorporates the novel features of the construction in Fig. 3 including the rear and intermediate annular recesses 39 and 40 respectively forming a frusto-conical shoulder 42 therebetween, which is provided on its surface with spiral grooves 44 together with the annular recess 43 formed in the valve seat 11. This modification also includes the novel features of the construction shown in Fig. 4 in that the angle of the generally conical surface of the valve head is made less than the conical surface of the valve seat with respect to the axis of the valve, forming a seat 45 adjacent the nozzle orifice 12 and a clearance 46 to the rear of the head.

It will now be apparent that applicant's novel construction provides an automatically operated fuel injector which produces a highly turbulent fuel charge that will enter the combustion chamber in a finely atomized condition at lower injection pressures than have previously been possible. Further, the novel construction is simple and compact, and positive and dependable in operation.

It will be obvious that the invention is not limited to the specific forms described and illustrated in the drawing but is capable of a variety of embodiments. Various changes which will now appear to those skilled in the art such as increasing the number or the form and location of the grooves in the valve head and other alterations may be made in the form and construction of the fuel injector without departing from the spirit of the invention; and reference is therefore to be had to the appended claims for a definition of the limits of the invention.

What is claimed is:

1. In a high pressure fuel injector, a valve having an integral head arranged to be automatically operated by the pressure of the liquid fuel, a valve seat cooperating with said head, said head and seat forming first a restricted conical passage, followed by an expanding passage terminating in a sharp edge, and then a conical passage of further restriction.

2. In a high pressure fuel injector, a valve having a generally conical head and arranged to be automatically operated by the pressure of the liquid fuel, a conical valve seat cooperating with said head, said head and seat forming first a restricted conical passage, followed by an expanding passage terminating in a sharp edge, and then a conical passage of further restriction.

3. In a high pressure fuel injector, a valve having a generally conical head and arranged to be automatically operated by the pressure of the liquid fuel, a conical valve seat cooperating with the head, said head having a recess at its rear portion for receiving liquid fuel, and a recess intermediate its ends for causing a turbulence and division of the liquid fuel charge.

4. In a high pressure fuel injector, a valve having a generally conical head and arranged to be automatically operated by the pressure of the liquid fuel, a conical valve seat cooperating with the head, said head having an annular recess intermediate its ends forming a sharp edge in the path of flow of the liquid fuel charge for causing a high turbulence and division of the fuel charge.

5. In a high pressure fuel injector, a valve having a generally conical head and arranged to be automatically operated by the pressure of the liquid fuel, a conical valve seat for cooperating with the head, said head having a recess intermediate its ends of gradually increasing depth and terminating in a wall substantially normal to the conical wall of the valve seat and forming a sharp edge in the path of liquid fuel.

6. In a high pressure fuel injector, a valve having a generally conical head and arranged to be automatically operated by a predetermined pressure of the liquid fuel, a conical valve seat cooperating with said head, an annular recess at the rear of said head, a second annular recess intermediate the ends of the head, the recesses being so constructed and arranged that the head and seat form a path for the liquid fuel that is first convergent, then divergent, and then again convergent with a sharp edge between the end of the divergent and beginning of the second convergent portions.

7. In a high pressure fuel injector, a casing, a valve in said casing having a generally conical head at one end, a valve seat in said casing cooperating with said head, and adjustable resilient means for normally holding the head against the valve seat but adapted to yield at a predetermined fuel pressure to move the valve, said valve, head and seat being so constructed and arranged as to provide a generally conical path for the fuel which is first convergent, then divergent, followed by an area of further convergence, and with a sharp edge being formed between the divergent and second convergent sections.

8. In a fuel injector, a casing, a valve in said casing having a generally conical head at one end, a valve seat in said casing cooperating with said head, and adjustable resilient means normally holding the head against the valve seat but adapted to yield at a predetermined fuel pressure to move the valve, said valve head having an annular recess at its rear portion for receiving the liquid fuel, and a second annular recess intermediate its ends of gradually increasing depth and terminating in a wall substantially normal to the conical wall of the valve seat and forming a sharp edge in the path of flow of the liquid fuel.

9. In a fuel injector, a valve having a generally conical head and arranged to be automatically operated by the pressure of the liquid fuel, said head having an annular recess intermediate its ends, a valve seat of generally conical shape cooperating with a head and having an annular recess corresponding with the recess in the valve head, said recesses causing a high turbulence and division of the liquid fuel charge.

10. In a fuel injector, a valve having a generally conical head and arranged to be automatically operated by the pressure of the liquid fuel, said head having an annular recess intermediate its ends of gradually increasing depth and terminating in a shoulder substantially normal to the face of the head, a conical valve seat cooperating with the head and having an annular recess of gradually increasing depth terminating in a shoulder substantially normal to the face of the seat, said head and seat forming a passage for the liquid fuel which is first convergent, then divergent, followed by an area of further convergence, with sharp edges being formed in the path between the divergent and second convergent sections by the terminating shoulders of the recesses.

11. In a fuel injector, a valve having a generally conical head and arranged to be automatically operated by the pressure of the liquid fuel, a conical valve seat cooperating with said head, said head having an annular recess at its rear portion and an annular recess intermediate its ends for forming a frusto-conical shoulder therebetween, said shoulder having spiral grooves formed in its periphery.

12. In a fuel injector, a valve having a generally conical head and arranged to be automatically operated by the pressure of the liquid fuel, a conical valve seat cooperating with said head, said head having spaced annular recesses of gradually increasing depth and forming a frusto-conical shoulder therebetween, said shoulder and intermediate recess forming an area of restriction and expansion respectively to the flow of liquid fuel followed by an area of further restriction, said conical shoulder having spiral grooves formed in its periphery for creating an expanding spray of the fuel.

13. In a high pressure fuel injector, a conical valve seat terminating in a discharge orifice, a valve having a conical head operating with said seat, the angle formed by the conical surface of said head with the axis of the head being less than the angle formed by the surface of the valve seat with the same axis, whereby the valve is seated at an area adjacent the orifice only, and said conical valve seat having an annular groove thereon for creating fuel turbulence.

14. In a fuel injector, a valve having a generally conical head and arranged to be automatically operated by the pressure of the liquid fuel, a conical valve seat cooperating with said head and having a slightly greater taper than said head, and an annular recess intermediate the ends of said head, said head and seat forming a path for the flow of liquid fuel which is first convergent then divergent and then again convergent with a sharp edge between the end of the divergent and beginning of the second convergent portions.

15. In a fuel injector, a valve having a generally conical head and arranged to be automatically operated by the pressure of the liquid fuel, a conical valve seat cooperating with said head and having a slightly greater taper than said head, a frusto-conical shoulder on said valve head formed by annular recesses at the rear and intermediate portions of said head, said frusto-conical shoulder having spiral grooves formed on its periphery.

16. In a high pressure fuel injector, a body portion having a conical valve seat, a movable valve having a generally conical head cooperating with the valve seat to form a generally conical fuel passage in the open position of the valve, said valve head having portions of different tapers, one of which is the same taper as the seat and the other of which is of slightly less taper, said valve head having an annular groove thereon between the tapered portions, and said groove terminating in a sharp edge and adapted to produce fuel turbulence in the generally conical fuel passage.

17. In a high pressure fuel injector, a body member having a tapered seat portion, a movable valve having a tapered head portion cooperating with said seat to form a generally conical fuel passage in the open position of the valve, one of said tapered portions having an annular groove therein arranged intermediate the ends of the tapered passage, said groove having its end wall that is nearer the valve seat arranged substantially normal to the tapered passage.

18. In a high pressure fuel injector, a body member having a tapered seat portion, a movable valve having a tapered head portion cooperating with said seat to form a generally conical fuel passage in the open position of the valve, one of said tapered portions having an annular groove therein arranged intermediate the ends of the tapered passage, said groove having its end wall that is nearer the valve seat arranged substantially normal to the tapered passage and said end wall having a sharp edge at its junction with the passage.

FRANK C. MOCK.